(12) United States Patent
Inayoshi et al.

(10) Patent No.: US 8,328,276 B2
(45) Date of Patent: Dec. 11, 2012

(54) APPARATUS AND METHOD FOR DETERMINING IMPACT ON VEHICLE AND APPARATUS FOR WARNING IMPACT ON VEHICLE

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 259 days.

(21) Appl. No.: 12/853,468

(22) Filed: Aug. 10, 2010

(65) Prior Publication Data

US 2011/0043009 A1    Feb. 24, 2011

(30) Foreign Application Priority Data

Aug. 24, 2009 (JP) ................. 2009-192920

(51) Int. Cl.
*B60N 2/42* (2006.01)
*B60R 21/013* (2006.01)
*B60R 21/0136* (2006.01)
*B60R 21/015* (2006.01)
(52) U.S. Cl. ............... 297/217.2; 297/216.1; 280/735
(58) Field of Classification Search ........... 297/216.1, 297/217.2; 280/735
See application file for complete search history.

(56) References Cited

U.S. PATENT DOCUMENTS

| 6,069,325 | A  | * | 5/2000  | Aoki ................... 280/735 X |
| 6,134,947 | A  | * | 10/2000 | Kwun .................. 280/735 X |
| 6,161,439 | A  | * | 12/2000 | Stanley ................ 280/735 X |
| 6,260,879 | B1 | * | 7/2001  | Stanley ................... 280/735 |
| 6,323,443 | B1 | * | 11/2001 | Aoki et al. ............ 280/735 X |
| 6,323,444 | B1 | * | 11/2001 | Aoki ..................... 280/735 X |
| 6,356,200 | B1 | * | 3/2002  | Hamada et al. ....... 280/735 X |
| 6,571,647 | B1 | * | 6/2003  | Aoki et al. ............ 280/735 X |
| 6,586,948 | B1 | * | 7/2003  | Aoki et al. ............ 280/735 X |
| 6,922,152 | B2 |   | 7/2005  | Sumi et al. |
| 6,945,560 | B2 | * | 9/2005  | Strutz et al. ............... 280/735 |
| 6,950,031 | B2 | * | 9/2005  | Selig et al. ........... 280/735 X |
| 7,043,997 | B2 | * | 5/2006  | Mattson et al. ....... 280/735 X |
| 7,055,365 | B2 | * | 6/2006  | Yanagi ................ 280/735 X |
| 7,261,179 | B2 | * | 8/2007  | Mochiduki et al. ... 280/735 X |
| RE40,096  | E  | * | 2/2008  | Stanley ................ 280/735 X |
| 7,444,889 | B2 | * | 11/2008 | Wehinger et al. ..... 297/217.2 X |
| 7,976,060 | B2 | * | 7/2011  | Breed ....................... 280/735 |

(Continued)

FOREIGN PATENT DOCUMENTS

JP    4267836 B    5/2009

*Primary Examiner* — Rodney B White
(74) *Attorney, Agent, or Firm* — Buchanan Ingersoll & Rooney PC

(57) ABSTRACT

An apparatus for determining an impact on a vehicle includes: a load detecting portion attached to an end portion of a seat portion of a seat for the vehicle, and detecting a compressing-direction load, and a pulling-direction load; and an impact determining portion determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, or in a case where the pulling-direction load, which is equal to or larger than a third predetermined value, is detected and subsequently the compressing-direction load, which is equal to or larger than a fourth predetermined value, is detected within a second predetermined time period.

13 Claims, 8 Drawing Sheets

U.S. PATENT DOCUMENTS

| | | | |
|---|---|---|---|
| 8,119,936 B2 * | 2/2012 | Bruzzone et al. | 280/735 X |
| 8,212,157 B2 * | 7/2012 | Ito et al. | 280/735 X |
| 2004/0262956 A1 * | 12/2004 | Senoo | 297/217.2 |
| 2005/0099041 A1 * | 5/2005 | Becker et al. | 297/217.2 |
| 2006/0103192 A1 * | 5/2006 | Norton | 297/217.2 |
| 2008/0036252 A1 * | 2/2008 | Breed | 297/217.2 |
| 2011/0005843 A1 * | 1/2011 | Ito et al. | 177/136 |
| 2011/0010037 A1 * | 1/2011 | Inayoshi et al. | 701/29 |
| 2011/0010038 A1 * | 1/2011 | Inayoshi et al. | 701/29 |
| 2011/0010039 A1 * | 1/2011 | Inayoshi et al. | 701/29 |
| 2011/0010056 A1 * | 1/2011 | Inayoshi et al. | 701/45 |
| 2011/0010109 A1 * | 1/2011 | Ito et al. | 702/41 |
| 2011/0012402 A1 * | 1/2011 | Inayoshi et al. | 297/217.2 |
| 2012/0001463 A1 * | 1/2012 | Breed et al. | 297/217.2 |

* cited by examiner

Front collision at the time of forward movement

Rear collision at the time of rearward movement

APPARATUS AND METHOD FOR DETERMINING IMPACT ON VEHICLE AND APPARATUS FOR WARNING IMPACT ON VEHICLE

CROSS REFERENCE TO RELATED APPLICATIONS

This application is based on and claims priority under 35 U.S.C. §119 to Japanese Patent Application 2009-192920, filed on Aug. 24, 2009, the entire content of which is incorporated herein by reference.

TECHNICAL FIELD

This disclosure relates to an apparatus for determining an impact on a vehicle, which determines that the impact is applied on the vehicle, and a method for determining an impact on a vehicle, which warns a passenger that the impact is applied on the vehicle.

BACKGROUND DISCUSSION

A known passenger weight measuring instrument apparatus for determining a seat occupancy is disclosed in, for example, JP4267836B. According to the apparatus for determining the seat occupancy, load sensors are arranged between a cushion portion of a vehicle seat and a vehicle floor. The apparatus for determining the seat occupancy determines an occupancy of the vehicle seat on the basis of a sum of the loads, detected by the load sensors, in order to control a deployment of an air-bag and to control an operation of a seatbelt pretentioner.

The load sensors are respectively provided at four corners of a lower portion of the cushion portion of the vehicle seat via brackets. The load sensors detect loads, applied on the four corners of the cushion portion of the vehicle seat. Further, a seat occupancy determining portion compares the sum of the loads, detected by the load sensors, with a predetermined threshold value, thereby determining the occupancy of the vehicle seat by a passenger.

The occupancy of the vehicle seat, which is determined by the apparatus for determining the seat occupancy, is used to control an operation of an air-bag. More specifically, in a case where it is determined that an adult is seated on a front passenger seat of the vehicle, the air-bag is controlled so as to be fully deployable. On the other hand, in a case where it is determined that a passenger is not seated on the vehicle seat or that a child is seated on a child seat, being fixed to the vehicle seat, the air-bag is controlled so as not to be deployable.

In a case where there is a minor collision of the vehicle, an impact is applied on the vehicle. The impact may cause an application of a load, whose value is equal to or lager than a predetermined value, on the vehicle seat, on which a passenger is seated. Consequently, a seat frame may be slightly deformed. In a case where the load sensor is attached to the deformed portion of the seat frame, a position of a zero point (i.e., a position where the detected load is determined to be zero) of a detection system of the load sensor may be displaced. Accordingly, a subsequent detection of the seat occupancy load, applied on the vehicle seat, may not be accurately executed.

When a user of a vehicle assumes a collision of a vehicle to be minor, the user may choose not to have the vehicle inspected and repaired. In such case, the user may be unaware of a reduced accuracy in detecting the seat occupancy load and an inaccurate determination of the seat occupancy of the vehicle seat. Alternatively, an acceleration sensor may be provided to a vehicle, and a user may be informed of an application of an impact on the vehicle on the basis of an acceleration, detected by the acceleration sensor. However, in such a case, the acceleration sensor, a signal processing circuit and the like may be required to be additionally provided to the vehicle. Accordingly, a manufacturing cost of the vehicle may be increased.

A need thus exists for apparatus and method for determining an impact on a vehicle and an apparatus for warning an impact on a vehicle, which is not susceptible to the drawback mentioned above.

SUMMARY

According to an aspect of this disclosure, an apparatus for determining an impact on a vehicle includes: a load detecting portion attached to an end portion of a seat portion of a seat for the vehicle that includes a seat back at a rear portion of the seat for the vehicle, and detecting a compressing-direction load, applied to the end portion of the seat portion toward a floor of the vehicle, and a pulling-direction load, applied to the end portion of the seat portion away from the floor of the vehicle; and an impact determining portion determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion by means of the load detecting portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion by means of the load detecting portion.

According to another aspect of this disclosure, an apparatus for warning an impact on a vehicle includes: an apparatus for determining the impact on the vehicle including a load detecting portion attached to an end portion of a seat portion of a seat for a vehicle that includes a seat back at a rear portion of the seat for the vehicle, and detecting a compressing-direction load, applied to the end portion of the seat portion toward a floor of the vehicle, and a pulling-direction load, applied to the end portion of the seat portion away from the floor of the vehicle, and an impact determining portion determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion by means of the load detecting portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion by means of the load detecting portion; and an impact warning portion warning a passenger of the vehicle that the impact is applied on the vehicle in a case where the apparatus for determining the impact on the vehicle determines that the impact is applied on the vehicle.

According to a further aspect of this disclosure, a method for determining an impact on a vehicle includes: detecting a compressing-direction load, applied to an end portion of a seat portion toward a floor of the vehicle, and a pulling-direction load, applied to the end portion of the seat portion away from the floor of the vehicle; and determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of an apparatus and a method for determining an impact on a vehicle and an apparatus for warning an impact on a vehicle will be described hereinafter with reference to FIGS. 1 to 11. In the description, a front direction, seen by a passenger seated on a seat 1 for a vehicle (which will be referred to as a vehicle seat 1), corresponds to a front of the vehicle seat 1. Likewise, a rear direction, seen by the passenger seated on the vehicle seat 1, corresponds to a rear of the vehicle seat 1. Further, a right direction, seen by the passenger seated on the vehicle seat 1, corresponds to a right of the vehicle seat 1. Furthermore, a left direction, seen by the passenger seated on the vehicle seat 1, corresponds to a left of the vehicle seat 1.

Figure 1:
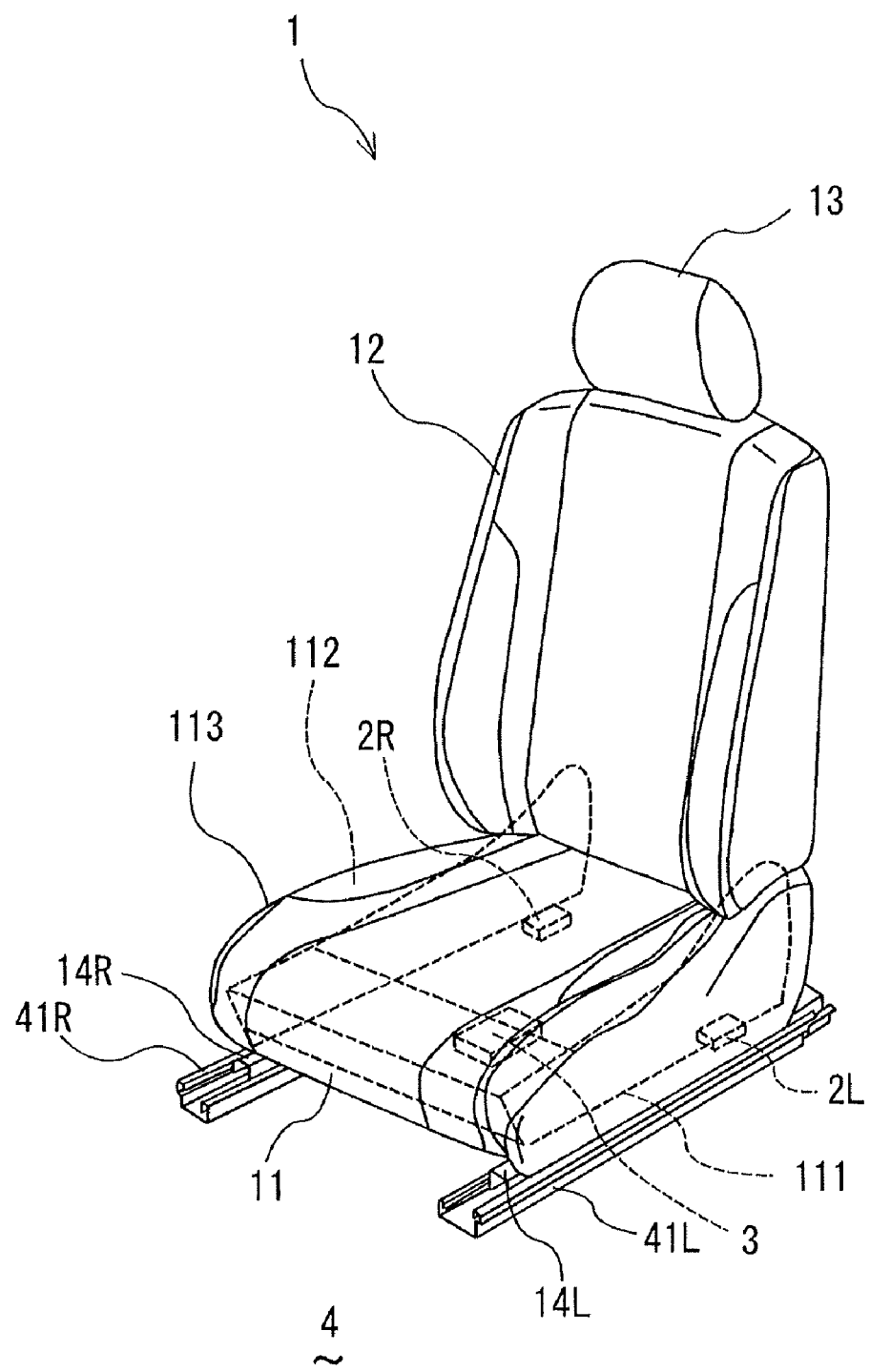
FIG. 1 is a perspective view illustrating a seat for a vehicle, on which an apparatus for determining an impact on the vehicle according to the embodiment is mounted.

The vehicle seat 1 for a front passenger is mounted on a left-hand drive vehicle. As illustrated in FIG. 1, the vehicle seat 1 includes a seat cushion (a seat portion) 11, on which the passenger is seated, and a seat back 12, attached to a rear end portion of the seat cushion 11 so as to be rotatable in a front-rear direction of the vehicle and supporting the back of the passenger. A headrest 13 for supporting a head of the passenger is attached to a top end of the seat back 12.

The seat cushion 11 includes a seat frame 111, a pad member 112, arranged at an upper portion of the seat frame 111, and a cover 113, covering surfaces of the pad member 112. A pair of upper rails (a right upper rail and a left upper rail) 14R and 14L are arranged at lower surfaces of the seat frame 111. The upper rails 14R and 14L are engaged with a pair of lower rails (a right lower rail and a left lower rail) 41R and 41L, respectively, which are fixed a floor 4 of the vehicle, so as to be relatively movable in the front-rear direction. According to such structure, the vehicle seat 1 is movable relative to the floor 4 of the vehicle in the front-rear direction and is fixable at a position, selected by the passenger.

A pair of seat occupancy sensors (a right seat occupancy sensor 2R (a right load detecting portion) and a left seat occupancy sensor (a left load detecting portion) 2L) (a load detecting portion) 2R and 2L are arranged between the seat frame 111 and the corresponding one of the upper rails 14R and 14L. The pair of seat occupancy sensors 2R and 2L are attached to a rear end portion of the seat cushion 11. Each of the pair of seat occupancy sensors 2R and 2L is configured by a load sensor, such as a strain gauge and the like. The pair of seat occupancy sensors 2R and 2L detect a load, applied on the seat cushion 11, for example, when the passenger is seated on the vehicle seat 1, or when luggage is placed on the vehicle seat 1. The pair of seat occupancy sensors 2R and 2L detect the load, applied on the seat cushion 11, in order to control a deployment of an air-bag or to control an operation of a seatbelt pretensioner. The embodiment does not limit types, configurations and detection principles of the pair of the seat occupancy sensors 2R and 2L.

The right seat occupancy sensor 2R for detecting a load, received by the seat cushion 11 at a right portion thereof, is arranged between a right portion of the seat frame 111 and the right upper rail 14R. Likewise, the left seat occupancy sensor 2L for detecting a load, received by the seat cushion 11 at a left portion thereof, is arranged between a left portion of the seat frame 111 and the left upper rail 14L. The right seat occupancy sensor 2R and the left seat occupancy sensor 2L are spaced away from each other by a predetermined distance in a width direction of the seat cushion 11. The right seat occupancy sensor 2R and the left seat occupancy sensor 2L will be inclusively referred to as the seat occupancy sensors 2R and 2L hereinafter.

Figure 2:
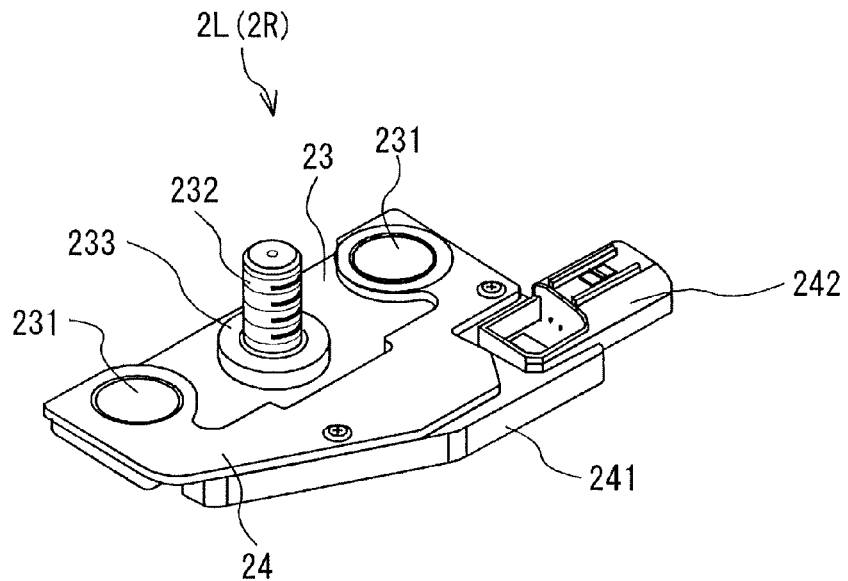
FIG. 2 is an enlarged view illustrating a seat occupancy sensor shown in FIG. 1.

As illustrated in FIG. 2, each of the seat occupancy sensors 2R and 2L (only the left seat occupancy sensor 2L is shown in FIG. 2) includes a strain member 23, made of a metal plate, a bracket 24 for holding the strain member 23, and an amplifier case 241, formed at a lower surface of the bracket 24. A strain gauge, by which a left sensor portion 21L (described later) is configured, is attached to a lower surface of the strain member 23. A left amplifier portion (described later) 22L is accommodated in the amplifier case 241. A connector 242 for connecting the left seat occupancy sensor 2L to a controller 3 is integrally formed at a front end of the amplifier case 241.

Bushes 231 are respectively attached to attachment holes, formed at front and rear end portions of the strain member 23.

Attachment bolts are arranged at the upper rail 14L so as to stand upright. The attachment bolts are inserted through the corresponding bushes 231 from below. Then, fastening nuts are screwed from above the bracket 24, thereby fastening the strain member 23 on the upper rail 14L. A sufficient interval is formed between the strain member 23 and the upper rail 14L in a state where the strain member 23 is fastened to the upper rail 14L, due to a thickness of the bushes 231, positioned below the strain member 23.

A stud bolt 232 is arranged at an intermediate portion of the strain member 23. A spacer 233 is attached to the stud bolt 232 so as to be positioned at an upper surface of the strain member 23. The stud bolt 232 is inserted through an attachment hole, formed at a lower surface of the seat frame 111. Then, a nut member is attached to the stud bolt 232 from above the stud bolt 232 so as to fasten the strain member 23 to a lower portion of the seat frame 111. A sufficient interval is formed between the strain member 23 and the seat frame 111 in a state where the strain member 23 is fastened to the seat frame 111, due to a thickness of the spacer 233.

According to such configuration, the strain member 23 may be strained in an upper-lower direction due to relative a displacement of a position of the seat frame 111 relative to the upper rail 14L. When the intermediate portion (the attachment portion of the stud bolt 232) of the strain member 23 is thrust downwardly, the strain member 23 is becomes a compressed state. When the intermediate portion of the strain member 23 is pulled upwardly, the strain member 23 becomes a pulled state. Each of the right and left sensor portions 21R and 21L detects that a load is applied on the seat cushion 11, when the strain member 23 is either in the compressed state or in the pulled state. The right seat occupancy sensor 2R is structured so as to be symmetrical to the left seat occupancy sensor 2L (shown in FIG. 2) in a right-left direction.

Figure 3:
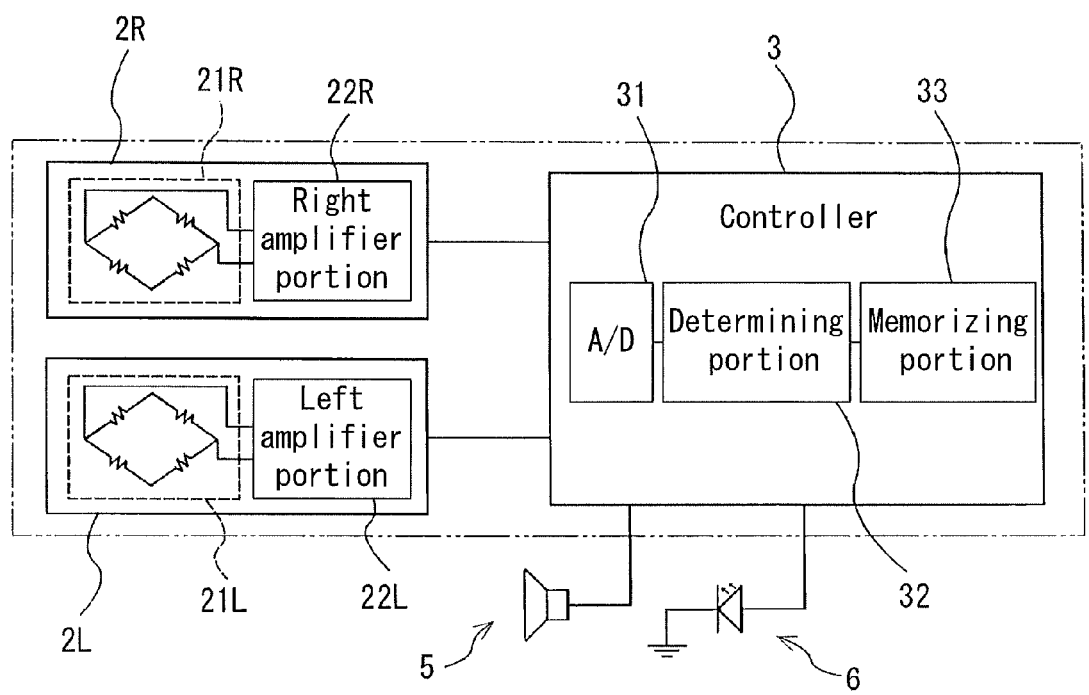
FIG. 3 is a block diagram illustrating an entire configuration of the apparatus for determining the impact on the vehicle.

As illustrated in FIG. 3, each of the right and left sensor portions 21R and 21L for configuring the seat occupancy sensors 2R and 2L, is formed by a Wheatstone bridge circuit, configured by one to four strain gauges. A bridge voltage, which is a voltage between midpoints of the Wheatstone bridge circuit, formed at each of the right and left sensor portions 21R and 21L, is inputted to each of the right and left amplifier portions 22R and 22L.

The seat occupancy sensors 2R and 2L are connected to the controller (an impact determining portion) 3. The controller 3 includes an ND converter 31, which converts detection signals, outputted from the seat occupancy sensors 2R and 2L, to digital signals, a determining portion 32, which determines a seat occupancy on the vehicle seat 1 on the basis of the detection signals, and a memorizing portion 33, which memorizes data required to determine the seat occupancy. Further, the determining portion 32 of the controller 3 determines whether or not an impact is applied on the vehicle seat 1 on the basis of the detection signals, outputted from the seat occupancy sensors 2R and 2L.

The controller 3 detects whether the strain member 23 of each of the seat occupancy sensors 2R and 2L is in the compressed state or in the pulled state on the basis of the bridge voltage of the Wheatstone bridge circuit of each of the right and left sensor portions 21R and 21L. According to the embodiment, whether the strain member 23 is in the compressed state or in the pulled state is determined on the basis of whether a value of the bridge voltage is positive or negative (a direction of the voltage). Alternatively, a predetermined positive value may be set to be a standard value of the bridge voltage. In such a case, the strain member 23 may be determined to be in the compressed state when a detected value of the voltage is the standard voltage or larger, or the strain member 23 may be determined to be in the pulled state when a detected value of the voltage is smaller than the standard value.

Further, the controller 3 detects a level of a strain of the strain member 23 (i.e., a value of a load, applied on a right or left portion of the seat cushion 11) on the basis of a level of the bridge voltage. The controller 3 is connected to each of an in-vehicle speaker 5 and a warning light-emitter 6, attached to an instrument panel. The warning light-emitter 6 may be configured by a light-emitting diode, and the like. Each of the in-vehicle speaker 5 and the warning light-emitter 6 serves as an impact warning portion.

When the controller 3 determines that the impact is applied on the vehicle, the controller 3 warns the passenger of the application of the impact on the vehicle by outputting an audio warning through the in-vehicle speaker 5 or by emitting a luminous warning through the warning light-emitter 6. The seat occupancy sensors 2R and 2L together with the controller 3 serve as an apparatus for determining the impact on the vehicle (shown by double-dashed line in FIG. 3).

Loads, applied on the seat cushion 11 of the vehicle seat 1 due to a collision, will be described hereinafter with reference to FIG. 4 and FIG. 5.

Figure 4:
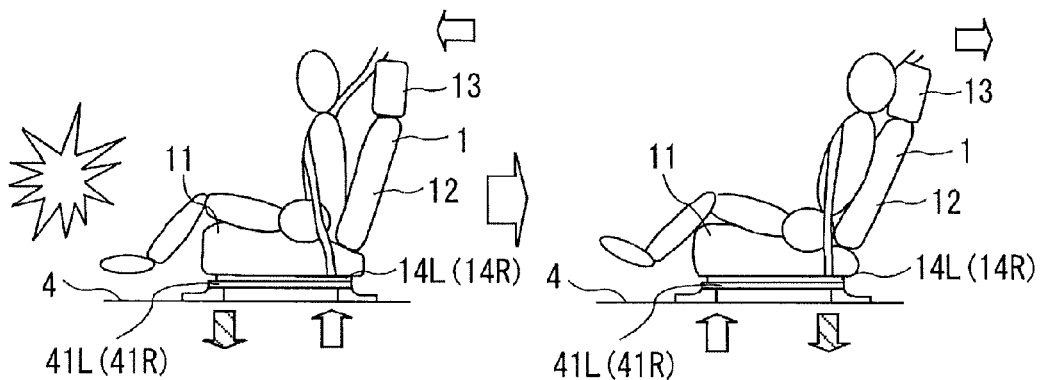
FIG. 4 is a simplified diagram illustrating loads, applied on the seat for the vehicle at the time of a collision of the vehicle at a front end thereof.

As illustrated on a left side of FIG. 4, in the case of a collision of the vehicle at a front portion thereof during a forward movement of the vehicle, an accelerated force is applied on the vehicle seat 1 and a passenger seated thereon, in a front direction at the moment of the collision. Consequently, a momentum is generated in a counter-clockwise direction in a left side of FIG. 4. Accordingly, a load, whose value is equal to or more than a predetermined value, is applied on a lower-front end of the seat cushion 11 toward the vehicle floor 4 (the load, applied toward the vehicle floor 4, will be hereinafter referred to as a compressing-direction load). On the other hand, a load, whose value is equal to or more than a predetermined value, is applied on a lower-rear end of the seat cushion 11 in a direction away from the vehicle floor 4 (the load, applied in the direction away from the vehicle floor 4, will be hereinafter referred to as a pulling-direction load).

Subsequently, within a predetermined short time after the collision of the vehicle at the front portion thereof, as illustrated on a right side of FIG. 4, the vehicle seat 1 returns toward its original position (i.e., in a rear direction). Consequently, a momentum is generated in a clockwise direction in the right side of FIG. 4. Accordingly, the pulling-direction load, whose value is equal to or more than the predetermined value, is applied on the lower-front of the seat cushion 11 and the compressing-direction load, whose value is equal to or more than the predetermined value, is applied on the lower-rear of the seat cushion 11.

Figure 5:
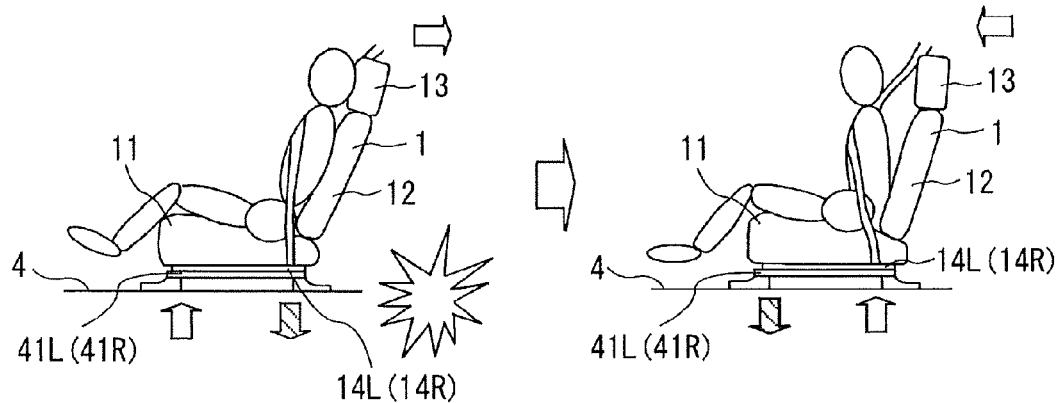
FIG. 5 is a simplified diagram illustrating loads, applied on the seat for the vehicle at the time of a collision of the vehicle at a rear portion thereof.

On the other hand, as illustrated in FIG. 5, in the case of a collision of the vehicle at the rear portion thereof during a rearward movement of the vehicle, a positional relationship, regarding the application of the load, is inverted in the front-rear direction relative to the collision at the front portion of the vehicle. More specifically, as illustrated on a left side of FIG. 5, in the case of a collision of the vehicle at the rear portion thereof during the rearward movement of the vehicle, an accelerated force is applied on the vehicle seat 1 and the passenger seated thereon, in the rear direction at the moment of the collision. Consequently, a momentum is generated in a clockwise direction in the left side of FIG. 5. Accordingly, the compressing-direction load, whose value is equal to or more than the predetermined value, is applied on the lower-rear of the seat cushion 11 and the pulling-direction load, whose value is equal to or more than the predetermined value, is applied on the lower-front of the seat cushion 11.

Subsequently, within the predetermined short time after the collision of the vehicle at the rear portion thereof, as illustrated on a right side of FIG. 5, the vehicle seat 1 returns toward its original position (i.e., in the front direction). Consequently, a momentum is generated in a counter-clockwise direction in the right side of FIG. 5. Accordingly, the pulling-direction load, whose value is equal to or more than the predetermined value, is applied on the lower-rear of the seat cushion 11 and the compressing-direction load, whose value is equal to or more than the predetermined value, is applied on the lower-front of the seat cushion 11.

When the compressing-direction load is applied, the strain member 23 of each of the seat occupancy sensors 2R and 2L is in the compressed state. Likewise, when the pulling-direction load is applied, the strain member 23 of each of the seat occupancy sensors 2R and 2L is in the pulled state. As described above, the vehicle seat 1 returns toward its original position within the short time after the collision at the front or rear portion of the vehicle. Such mechanism may be caused by rigidity of the seat frame 111, the vehicle floor 4 and the like.

The loads, applied on the seat cushion 11 of the vehicle seat 1 due to the collision at the front or rear of the vehicle, has been described so far. Further, even at the time of a collision in different directions, the loads are applied on the vehicle seat 1 in a similar manner. More specifically, even at the time of a collision of the vehicle at sides thereof or even at the time of a collision of the vehicle obliquely, the compressing-direction load, whose value is equal to or larger than the predetermined value, is applied on an end portion of the seat cushion 11 close to the hit portion, and the pulling-direction load, whose value is equal to or larger than the predetermined value, is applied on an end portion of the seat cushion 11 away from the hit portion, at the moment of the collision. Subsequently, the vehicle seat 1 returns toward its original position within the predetermined short time after the collision.

Figure 6:
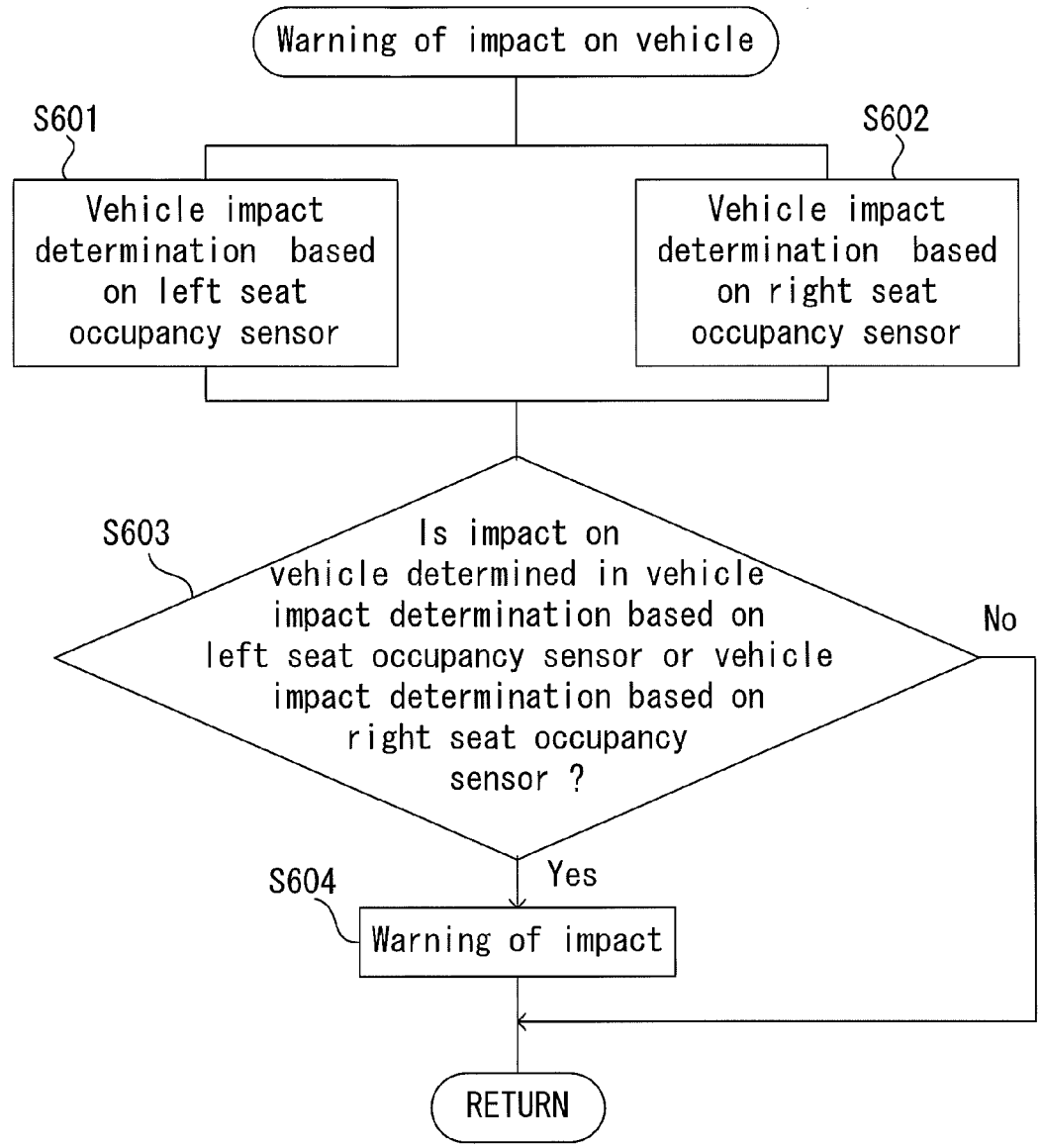
FIG. 6 is a main flowchart illustrating a method for warning the impact on the vehicle by means of the apparatus for warning the impact on the vehicle.

A method for warning an impact on the vehicle seat 1 of the vehicle by means of the controller 3 will be described hereinafter with reference to FIG. 6. First, a determination of the impact on the vehicle on the basis of the load, received by the right portion of the seat cushion 11 and detected by the right seat occupancy sensor 2R (which will be referred to as a vehicle impact determination based on the right seat occupancy sensor 2R), and a determination of the impact on the vehicle on the basis of the load, received by the left portion of the seat cushion 11 and detected by the left seat occupancy sensor 2L (which will be referred to as a vehicle impact determination based on the left seat occupancy sensor 2L), are executed simultaneously (Steps 602 and 601).

Subsequently, it is determined whether or not the impact on the vehicle is determined in at least one of the vehicle impact determination based on the right seat occupancy sensor 2R and the vehicle impact determination based on the left seat occupancy sensor 2L (Step 603). When the impact on the vehicle is determined in at least one of the vehicle impact determination based on the right seat occupancy sensor 2R and the vehicle impact determination based on the left seat occupancy sensor 2L, the in-vehicle speaker 5 or the warning light-emitter 6 is actuated in order to warn the passenger the application of the impact on the vehicle (a warning of an impact in Step 604). Accordingly, the passenger is informed of a necessity of having the vehicle inspected. On the other hand, when the impact on the vehicle is not determined in any one of the vehicle impact determination based on the right seat occupancy sensor 2R and the vehicle impact determina-tion based on the left seat occupancy sensor 2L, the warning of the impact is not executed and the flow of the control is ended.

Figure 7:
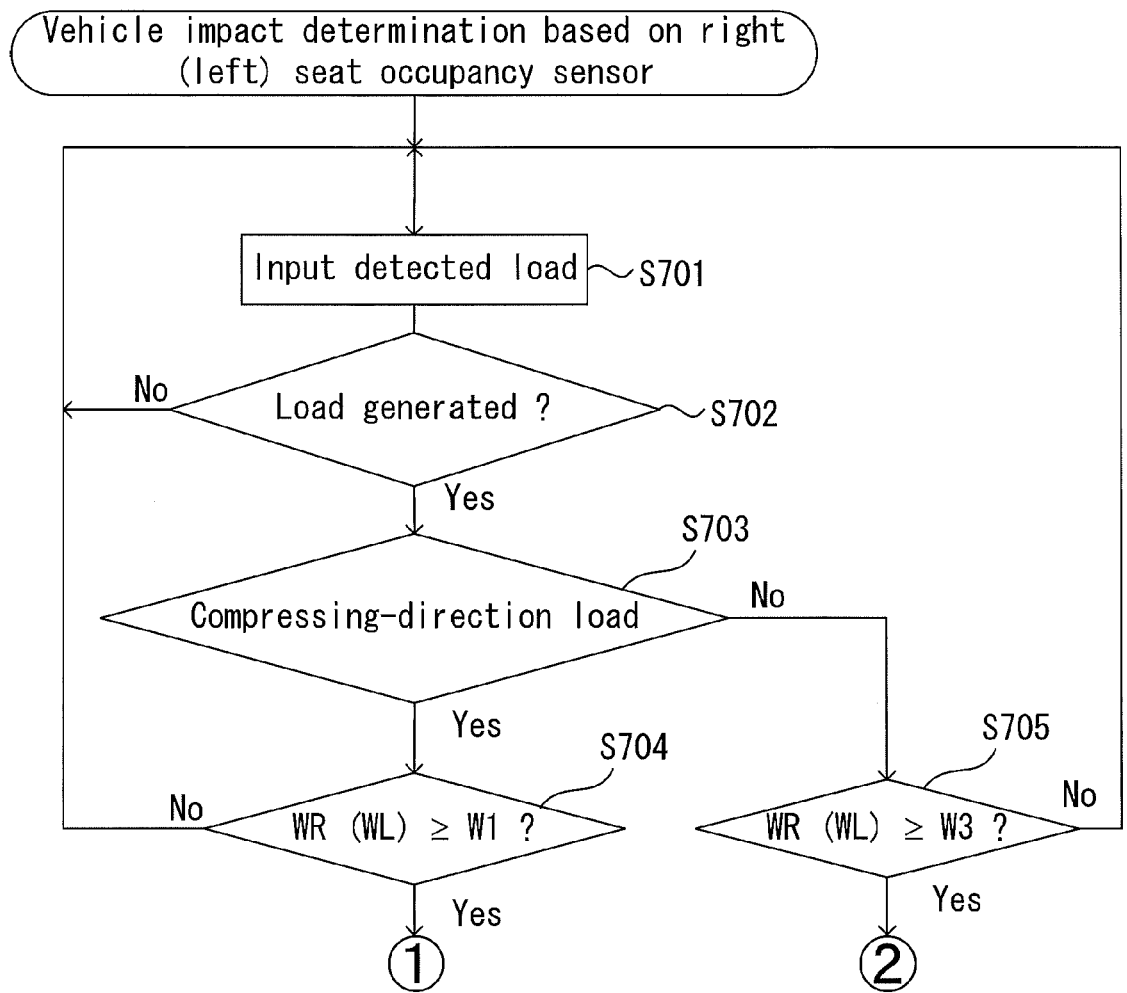
FIG. 7 is a first-half of a flowchart illustrating of a method for determining the impact on the vehicle shown in FIG. 6.
Figure 8:
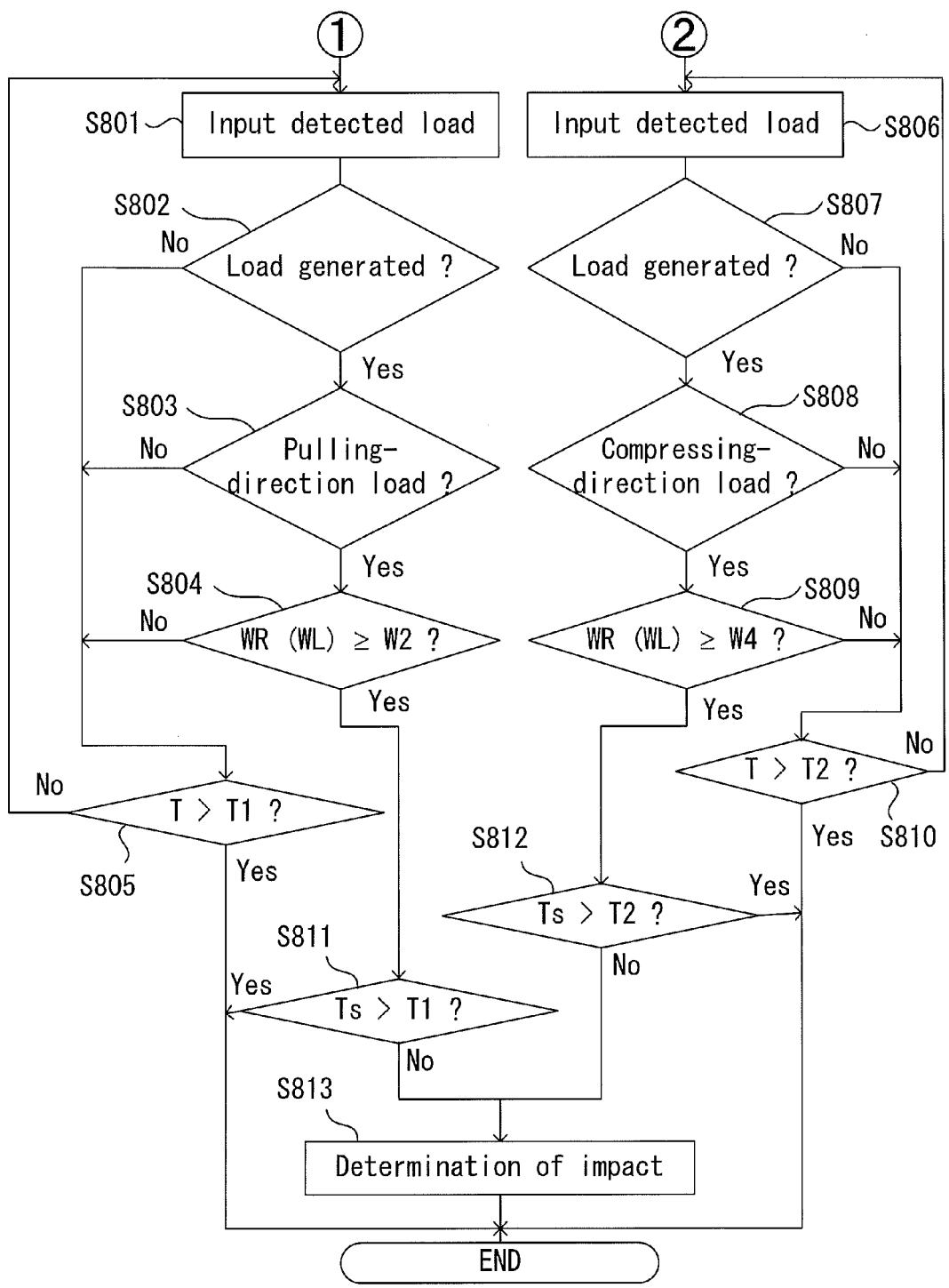
FIG. 8 is a second-half of the flowchart illustrating the method for determining the impact on the vehicle shown in FIG. 6.

The vehicle impact determination based on the right seat occupancy sensor 2R and the vehicle impact determination based on the left seat occupancy sensor 2L, shown in FIG. 6, will be described hereinafter with reference to FIGS. 7 and 8. The vehicle impact determination based on the right seat occupancy sensor 2R and the vehicle impact determination based on the left seat occupancy sensor 2L differ from each other only in that the vehicle impact determination based on the right seat occupancy sensor 2R is executed on the basis of the load, detected by the right seat occupancy sensor 2R and that the vehicle impact determination based on the left seat occupancy sensor 2L is executed on the basis of the load, detected by the left seat occupancy sensor 2L. Therefore, only one flowchart, shown in FIG. 7, will be used to describe both of the vehicle impact determination based on the right seat occupancy sensor 2R and the vehicle impact determination based on the left seat occupancy sensor 2L. Further, in the following description, only the vehicle impact determination based on the right seat occupancy sensor 2R will be described as an example.

First, a value of a load WR, detected by the right seat occupancy sensor 2R, is inputted to the controller 3 (Step 701). Then, the controller 3 determines whether or not a load is generated on the basis of the detected load WR (Step 702). More specifically, the controller 3 determines whether or not the detected load WR is larger than zero by a predetermined value $\delta$ ($\delta \approx 0$). When a value of the detected load WR is smaller than the predetermined value $\delta$, it is determined that a load is not generated, and the flow of the control is ended.

When it is determined that a value of the detected load WR is the predetermined value $\delta$ or larger (i.e., it is determined that a load is generated), it is determined whether the detected load is in the pulling-direction load or in the compressing-direction load (Step 703). When the detected load WR is determined to be the compressing-direction load, it is determined whether or not the value of the detected load WR is equal to or larger than a first threshold value W1 for the compressing-direction load (Step 704). The first threshold value W1 (a first predetermined value) serves as a threshold value for the compressing-direction load, generated when the impact is applied on the vehicle (i.e., a threshold value for the compressing-direction load shown on the left side of FIG. 4 and on the left side of FIG. 5).

When the value of the detected load WR is determined to be smaller than the first threshold value W1, serving as the threshold value for the compressing-direction load, the flow of the control is ended. When the detected load WR is determined to be equal to or larger than the first threshold value W1, the flow of the control proceeds to Step 801 (see FIG. 8). On the other hand, when the detected load WR is determined to be the pulling-direction load, it is determined whether or not the value of the detected load WR is equal to or larger than a third threshold value W3 for the pulling-direction load (Step 705). The third threshold value W3 (a third predetermined value) serves as a threshold value for the pulling-direction load, generated when the impact is applied on the vehicle (i.e., a threshold value for the pulling-direction load shown on the left side of FIG. 4 and on the left side of FIG. 5). When the value of the detected load WR is determined to be smaller than the third threshold value W3 for the pulling-direction load, the flow of the control is ended. When the value of the detected load WR is determined to be equal to or larger than the third threshold value W3 for the pulling-direction load, the flow of the control proceeds to Step 806 (see FIG. 8).

The load WR, detected by the right seat occupancy sensor 2R, is inputted to the controller 3 once more in Step 801. Then, the controller 3 determines whether or not a load is generated on the basis of the detected load WR in Step 802. When it is determined that the value of the detected load WR is the predetermined value δ or larger (i.e., it is determined that a load is generated), it is determined that whether the detected load is in the pulling-direction load or in the compressing-direction load (Step 803). When the detected load WR is the pulled direction load, it is determined whether or not the value of the detected load WR is equal to or larger than a second threshold value W2 for the pulling-direction load (Step 804). The second threshold value W2 (a second predetermined value) serves as a threshold value for the pulling-direction load, generated when the vehicle seat 1 returns toward its original position within a short time after the impact is applied on the vehicle (i.e., a threshold value for the pulling-direction load shown on the right side of FIG. 4 and on the right side of FIG. 5).

When the value of the detected load WR is the second threshold value W2 or larger, it is determined whether or not a first time period Ts is longer than a first threshold time period (a first predetermined time period) T1 in Step 811. A time period, which elapses after the value of the detected load WR is determined to be equal to or larger than the first threshold value W1 for the compressing-direction load in Step 704 before the value of the detected load WR is determined to be equal to or larger than the second threshold value W2 for the pulling-direction load, serves as the first time period Ts. When it is determined that the first time period Ts is longer than the first threshold time period T1, the flow of the control is ended. On the other hand, when it is determined that the first time period Ts is not longer than the first threshold time period T1, the controller 3 determines that the impact is applied on the vehicle due to, for example, a collision (Step 813).

In a case where the value of the detected load WR is determined to be smaller than the predetermined value δ (i.e., it is determined that a load is not generated) in Step 802, where the detected load WR is determined to be the compressing-direction load in Step 803, and where the value of the detected load WR is determined to be smaller than the second threshold value W2 for the pulling-direction load in Step 804, it is determined whether or not a second time period T is longer than the first threshold time period T1 (Step 805). A time period, which elapses after the value of the detected load WR is determined to be equal to or larger than the first threshold value W1 for the compressing-direction load in Step 704, serves as the second time period T. When it is determined that the second time period T is not longer than the first threshold time period T1, the flow of the control returns to Step 801. On the other hand, when it is determined that the second time period T is longer than the first threshold time period T1, the flow of the control is ended.

Further, the load WR, detected by the right seat occupancy sensor 2R, is inputted to the controller 3 once more in Step 806. Then, the controller 3 determines whether or not a load is generated on the basis of the detected load WR in Step 807. When it is determined that the value of the detected load WR is the predetermined value δ or larger (i.e., it is determined that a load is generated), it is determined that whether the detected load is in the compressing-direction load or in the pulling-direction load (Step 808). When the detected load WR is the compressed direction load, it is determined whether or not the value of the detected load WR is equal to or larger than a fourth threshold value W4 for the compressing-direction load (Step 809). The fourth threshold value W4 (a fourth predetermined value) serves as a threshold value for the compressing-direction load, generated when the vehicle seat 1 returns toward its original position within a short time after the impact is applied on the vehicle (i.e., a threshold value for the compressing-direction load shown on the right side of FIG. 4 and on the right side of FIG. 5).

When the value of the detected load WR is the fourth threshold value W4 or larger, it is determined whether or not the first time period Ts is longer than a second threshold time period (a second predetermined time period) T2 in Step 812. A time period, which elapses after the value of the detected load WR is determined to be equal to or larger than the third threshold value W3 for the pulling-direction load in Step 705 before the value of the detected load WR is determined to be equal to or larger than the fourth threshold value W4 for the compressing-direction load, serves as the time first time period Ts. When it is determined that the first time period Ts is longer than the second threshold time period T2, the flow of the control is ended. On the other hand, when it is determined that the first time period Ts is not longer than the second threshold time period T2, the controller 3 determines that the impact is applied on the vehicle due to, for example, a collision (Step 813).

In a case where the value of the detected load WR is determined to be smaller than the predetermined value δ (i.e., it is determined that a load is not generated) in Step 807, where the detected load WR is determined to be the pulling-direction load in Step 808, and where the value of the detected load WR is determined to be smaller than the fourth threshold value W4 for the compressing-direction load in Step 809, it is determined whether or not the second time period T is longer than the second threshold time period T2 (Step 810). A time period, which elapses after the value of the detected load WR is determined to be equal to or larger than the third threshold value W3 for the pulling-direction load in Step 705, serves as the second time period T. When it is determined that the second time period T is not longer than the second threshold time period T2, the flow of the control returns to Step 806. On the other hand, when it is determined that the second time period T is longer than the second threshold time period T2, the flow of the control is ended.

Figure 9:
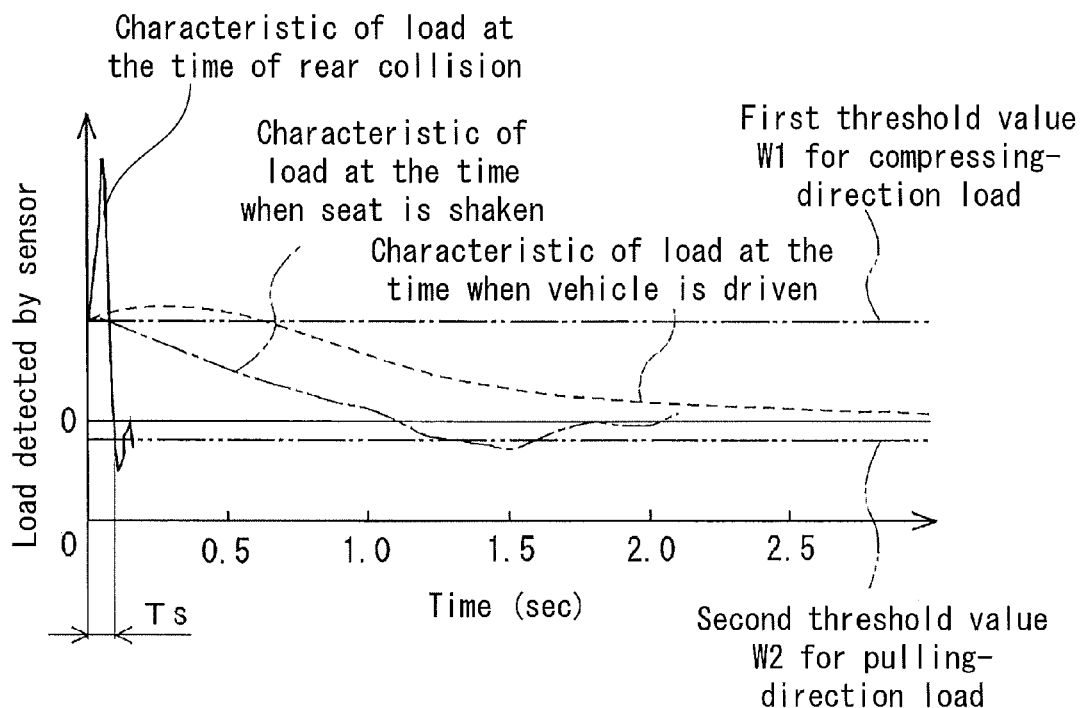
FIG. 9 is a diagram comparing characteristics of loads, detected by the seat occupancy sensors at the time of a collision of the vehicle at the rear portion thereof, with characteristics of loads, detected at situations other than the collision.
Figure 10:
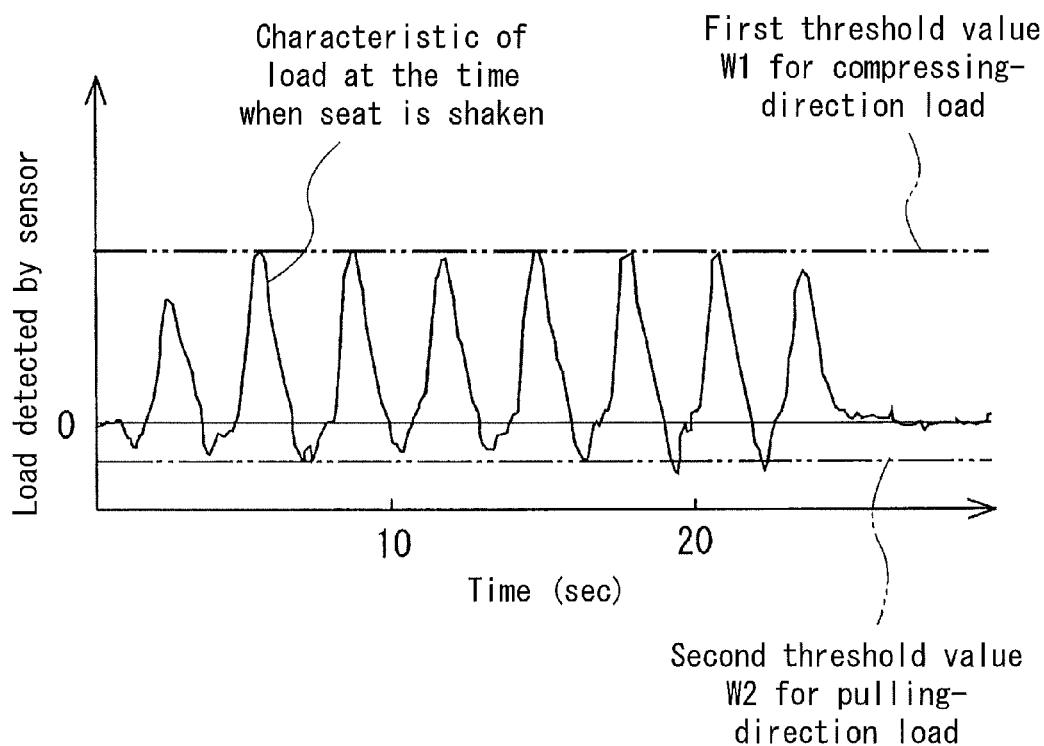
FIG. 10 is a diagram illustrating characteristics of loads, detected by means of the seat occupancy sensors when the seat for the vehicle is shaken.
Figure 11:
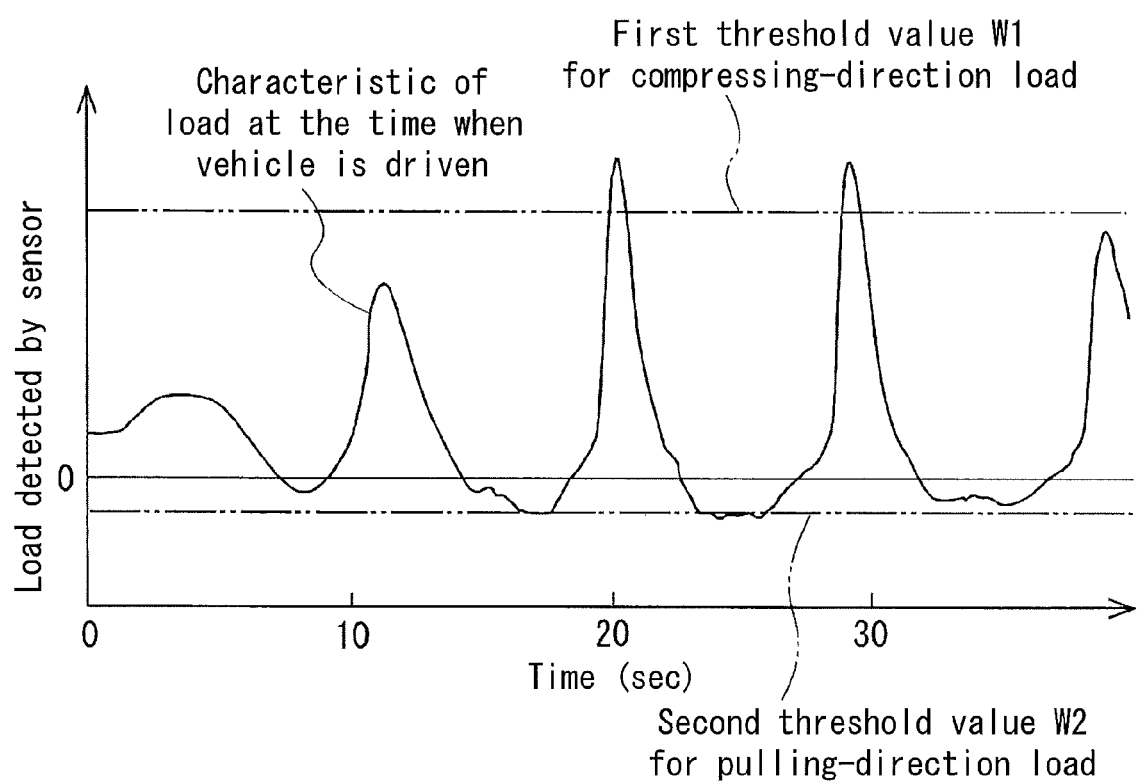
FIG. 11 is a diagram illustrating characteristics of loads, detected when the vehicle is being driven.

Characteristics of the loads, detected by the seat occupancy sensors 2R and 2L when the impact is applied on the vehicle due to collision, will be described hereinafter, comparing with characteristics of the load, detected at situations other than the collision, with reference FIGS. 9 to 11. Lines, shown in FIGS. 9 to 11, illustrate the characteristics of the load, detected by only one of seat occupancy sensors 2R and 2L. Further, in FIGS. 9 to 11, when the detected load, detected by each of the seat occupancy sensors 2R and 2L is shown in a positive range on the vertical axis, the detected load is the compressing-direction load, and when the detected load, detected by each of the seat occupancy sensors 2R and 2L is shown in a negative range on the vertical axis, the detected load is the pulling-direction load. Further, in FIGS. 9 to 11, the lower in the negative range a value of the pulling-direction load is shown, the larger the value of the pulling-direction load is.

A line, indicated by a dashed-line in FIG. 9, illustrates the load, detected by each of the seat occupancy sensors 2R and 2L when the passenger shakes the vehicle seat 1, for example, by hand. A line, shown in FIG. 10, corresponds to the line, indicated by the dashed-line in FIG. 9. A temporal length on a horizontal line in FIG. 10 is elongated substantially ten times longer than that of FIG. 9.

A line, indicated by a short dashed-line in FIG. 9, illustrates the load, detected by each of the seat occupancy sensors 2R and 2L when the vehicle is driven on a road, whose surfaces forms an uneven shape (an uneven-surfaced road). A line, shown in FIG. 11, corresponds to the line, indicated by the short dashed-line in FIG. 9. A temporal length on a horizontal axis in FIG. 11 is elongated substantially ten times longer than that of FIG. 9.

As illustrated in FIG. 9, for example at the time of a collision of the vehicle at the rear portion thereof, each of the seat occupancy sensors 2R and 2L firstly detects the compressing-direction load, whose value is equal to or larger than the first threshold value W1, and subsequently detects the pulling-direction load, whose value is equal to or larger than the second threshold value W2, within the first time period Ts. According to FIG. 9, the first time period Ts, which elapses after the value of the compressing-direction direction changes to be equal to or larger than the first threshold value W1 before the value of the pulling-direction load changes to be equal to or larger than the second threshold value W2, is as short as 0.2 seconds.

On the other hand, a time cycle of the compressing-direction and pulling-direction loads, included in the load detected when the vehicle seat 1 is shaken and when the vehicle is being driven, is ten times longer than a time cycle of the compressing-direction and pulling-direction loads, included in the load detected at the time of the vehicle collision. Further, the values of the compressing-direction load and the pulling-direction load rarely change to be equal to or larger than the first threshold value W1 and the second threshold value W2, respectively.

Each of the first and fourth threshold values W1 and W4 for the compressing-direction load and the second and third threshold values W2 and W3 for the pulling-direction load is set to a value, by which the load, applied on the seat cushion 11 due to the impact on the vehicle at the time of a collision, is distinguished from the load, applied on the seat cushion 11 at situations other than the collision. Further, each of the first and second threshold time period T1 and T2 is set so that the time cycle of the compressing-direction and pulling-direction loads, each of which is continuously applied on the seat cushion 11 due to the impact on the vehicle at the time of a collision, is distinguished from the time cycle of the compressing-direction and pulling-direction loads, each of which is applied on the seat cushion 11 at situations other than the collisions. Accordingly, the application of the impact on the vehicle may be determined on the basis of the loads, detected by the seat occupancy sensors 2R and 2L.

According to the embodiment, the application of the impact on the vehicle is determined in a case where the pulling-direction load, whose value is equal to or larger than the second threshold value W2, is detected within the first threshold time period T1 after the compressing-direction load, whose value is equal to or larger than the first threshold value W1, is detected, in the vicinity of the seat cushion 11 by means of the seat occupancy sensors 2R and 2L. Further, according to the embodiment, the application of the impact on the vehicle is determined in a case where the compressing-direction load, whose value is equal to or larger than the fourth threshold value W4, is detected within the second threshold time period T2 after the pulling-direction load, whose value is equal to or larger than the third threshold value W3, is detected, in the vicinity of the seat cushion 11 by means of the seat occupancy sensors 2R and 2L. Accordingly, only by using the known seat occupancy sensors so as to detect the loads, applied on the seat cushion 11, the application of the impact on the vehicle may be easily determined.

Further, the seat occupancy sensors 2R and 2L are attached to the rear end portion of the seat cushion 11. Therefore, it may be easily determined that the impact is applied on the vehicle due to the collision at the front or rear portion of the vehicle. Further, the seat occupancy sensors 2R and 2L are attached to the rear end portion of the seat cushion 11. Therefore, the load of the passenger and the like may be easily applied on the seat occupancy sensors 2R and 2L. Accordingly, even when the seat occupancy sensors 2R and 2L are not attached to the front portion of the seat cushion 11, the change of the load, applied on the seat cushion 11, may be easily detected. As a result, both an accurate determination of the impact on the vehicle and a reduction of cost of the vehicle seat 1 by way of decreasing the number of the seat occupancy sensors 2R and 2L may be achieved at the same time.

The seat occupancy sensors 2R and 2L are attached to the right and left portions of the seat cushion 11, respectively. Further, the controller 3 determines the application of the impact on the vehicle in a case where the pulling-direction load, whose value is equal to or larger than the second threshold value W2, is detected within the first threshold time period T1 after the compressing-direction load, whose value is equal to or larger than the first threshold value W1, is detected by means of at least one of the seat occupancy sensors 2R and 2L, or in a case where the compressing-direction load, whose value is equal to or larger than the fourth threshold value W4, is detected within the second threshold time period T2 after the pulling-direction load, which is equal to or larger than the third threshold value W3, is detected, by means of at least one of the seat occupancy sensors 2R and 2L. Accordingly, even when the loads are not equally applied on the left and right portions of the seat cushion 11, the change of the loads may not be overlooked and the application of the impact on the vehicle may be accurately determined. Furthermore, the in-vehicle speaker 5 and the warning light-emitter 6 are provided. Therefore, when the application of the impact on the vehicle is determined, the passenger may be warned that the impact is applied on the vehicle. Accordingly, the passenger may be informed that the vehicle needs to be inspected.

[Other Embodiment]

The apparatus and method for determining the impact on the vehicle and the apparatus for warning the impact on the vehicle may be modified as follows. The apparatus for determining the impact on the vehicle and the apparatus for warning the impact on the vehicle may be applied not only to the vehicle seat 1 for a front passenger but also to rear seats, such as second-row or third-row seats.

Further, not only the load sensors, configured by strain gauges, but also other sensors for detecting the compressing-direction load and the pulling direction load, applied on the seat cushion 11, may be used as the seat occupancy sensors 2R and 2L. For example, pressure sensors for detecting pressure, generated due to the load, applied on the seat cushion 11, may be used as the seat occupancy sensors 2R and 2L. In such a case, the compressing-direction load and the pulling-direction load, applied on the seat cushion 11, may be detected on the basis of the detected pressure. Alternatively, displacement sensors for detecting a displacement of the seat cushion 11 may be used as the seat occupancy sensors 2R and 2L. In such a case, the compressing-direction load and the pulling-direction load, applied on the seat cushion 11, may be detected on the basis of a displaced amount of the seat cushion 11 against a biasing force of seat springs.

At least one of the seat occupancy sensors 2R and 2L may be provided to an end portion of the seat cushion 11. Further, in a case where a plurality of seat occupancy sensors 2R and 2L are provided to the seat cushion 11, one pair of seat occupancy sensors 2R and 2L may be attached to the front end portion of the seat cushion 11. Alternatively, the seat occupancy sensors 2R and 2L may be attached to a front-right portion and a rear-left portion of the seat cushion 11, respectively. Further, alternatively, the seat occupancy sensors 2R and 2L may be attached to a rear-right portion and a front-left portion of the seat cushion 11, respectively. Further, the seat occupancy sensors 2R and 2L may be attached to the seat cushion 11 at four corners thereof, respectively. In such cases, the application of the impact on the vehicle is determined in a case where the pulling-direction load, whose value is equal to or larger than the second threshold value W2, is detected within the first threshold time period T1 after the compressing-direction load, whose value is equal to or larger than the first threshold value W1, is detected by means of at least one of the seat occupancy sensors 2R and 2L, or in a case where the compressing-direction load, whose value is equal to or larger than the fourth threshold value W4, is detected within the second threshold time period T2 after the pulling-direction load, whose value is equal to or larger than the third threshold value W3, is detected, by means of at least one of the seat occupancy sensors 2R and 2L.

The apparatus for determining the impact on the vehicle may determine the application of the impact on the vehicle and the apparatus for warning the impact on the vehicle may warn the passenger that the impact is applied on the vehicle, not only at the time of a collision of the vehicle at the front or rear portion thereof but also at the time of a collision of the vehicle at a side thereof or obliquely. Further, the apparatus for determining the impact on the vehicle may determine the application of the impact on the vehicle and the apparatus for warning the impact on the vehicle may warn the passenger that the impact is applied on the vehicle, even when the impact is applied on the vehicle due to causes other than the vehicle collision, such as a sudden braking of the vehicle.

The first threshold time period T1 and the second threshold time period T2 according to the embodiment may be set to be the same, or otherwise, to be different from each other. Further, the first threshold value W1 and the fourth threshold value W4 for the compressing-direction load may be set to be the same, or otherwise, to be different from each other. Furthermore, the second threshold value W2 and the third threshold value W3 for the pulling-direction load may be set to be the same, or otherwise, to be different from each other.

Each of the first to forth threshold values W1 to W4 is set so that the load, applied on the seat cushion 11 due to a collision of the vehicle, is distinguished from the load, applied on the seat cushion 11 at situations other than the collision. Further, the first and second threshold time period T1 and T2 are set to include a time cycle of the compressing-direction and the pulling direction loads, which are continuously applied on the seat cushion 11 due to the impact on the vehicle. Each of the first and second threshold values T1 and T2 is set so that the change of the load, applied on the seat cushion 11 due to the collision of the vehicle, is distinguished from the change of the load, applied on the seat cushion 11 at situations other than the collision.

According to the embodiment, the controller 3 determines that the impact is applied on the vehicle in a case where the compressing-direction load, which is equal to or larger than the first threshold value W1, is detected and subsequently the pulling-direction load, which is equal to or larger than the second threshold value W2, is detected within the first threshold time period T1, at the end portion of the seat cushion 11 by means of the seat occupancy sensor 2R and 2L, or in a case where the pulling-direction load, which is equal to or larger than the third threshold value W3, is detected and subsequently the compressing-direction load, which is equal to or larger than the fourth threshold value W4, is detected within the second threshold time period T2, at the end portion of the seat cushion 11 by means of the seat occupancy sensor 2R and 2L.

Accordingly, only by using the known seat occupancy sensors so as to detect the loads, applied on the seat cushion 11, the application of the impact on the vehicle may be easily determined.

When the impact is applied on the vehicle due to the collision and the like, the compressing-direction load and the pulling-direction load are continuously applied on the end portions of the seat cushion 11 of the vehicle for equal to or shorter than the first and second threshold time period T1 and T2, respectively. Further, the value of the compressing-direction load changes to be equal to or larger than the first or fourth threshold value W1 or W4. The value of the pulling-direction load changes to be equal to or larger than the second or third threshold value W2 or W3. More specifically, when a collision occurs to the vehicle in its moving direction, the compressing-direction load, whose value is equal to or larger than the first threshold value W1, is applied and subsequently, the pulling-direction load, whose value is equal to or larger than the second threshold value W2, is applied, on the end portion of the seat cushion 11 close to the moving direction. Further, the pulling-direction load, whose value is equal to or larger than the third threshold value W3, is applied and subsequently, the compressing-direction load, whose value is equal to or larger than the fourth threshold value W4, is applied, on the end portion of the seat cushion 11 opposite to the moving direction. The loads, applied due to the impact on the vehicle, are detected by the seat occupancy sensors 2R and 2L, attached to the seat cushion 11. Accordingly, the application of the impact on the vehicle may be easily determined.

According to the embodiment, the seat occupancy sensor 2R and 2L is attached to the seat cushion 11 at least one of a front end portion and a rear end portion of the vehicle seat 1.

Accordingly, it may be easily determined that the impact in a front-rear direction of the vehicle, which may occur at a relatively high frequency, is applied on the vehicle due to the collision of the vehicle at the front or rear end thereof.

According to the embodiment, the seat occupancy sensor 2R and 2L is attached to the seat cushion 11 at the rear end portion of the vehicle seat 1.

The seat occupancy sensors 2R and 2L may easily detect the load of the passenger and the like sitting on the seat. Accordingly, even when the seat occupancy sensors 2R and 2L are not attached to the front portion of the seat cushion 11, the change of the load, applied on the seat cushion 11, may be easily detected. As a result, both an accurate determination of the impact on the vehicle and a reduction of cost of the vehicle seat 1 by way of decreasing the number of the seat occupancy sensors 2R and 2L may be achieved at the same time.

According to the embodiment, the seat occupancy sensor 2R and 2L includes a left seat occupancy sensor 2L and a right seat occupancy sensor 2R attached to the seat cushion 11 at a left portion and a right portion of the vehicle seat 1, respectively. The controller 3 determines that the impact is applied on the vehicle in a case where the compressing-direction load, which is equal to or larger than the first threshold value W1, is detected and subsequently the pulling-direction load, which is equal to or larger than the second threshold value W2, is detected within the first threshold time period T1, by means of at least one of the left and right seat occupancy sensors 2L and 2R, which are respectively attached to the seat cushion 11 at the left portion and the right portion of the vehicle seat 1, or in a case where the pulling-direction load, which is equal to or larger than the third threshold value W3, is detected and subsequently the compressing-direction load, which is equal to or larger than the fourth threshold value W4, is detected within the second threshold time period T2, by means of at least one of the left and right seat occupancy sensors 2L and 2R, which are respectively attached to the seat cushion 11 at the left portion and the right portion of the vehicle seat 1.

Accordingly, even when the loads are not equally applied on the left and right portions of the seat cushion 11, the change of the loads may not be overlooked and the application of the impact on the vehicle may be accurately determined.

According to the embodiment, the apparatus for warning the impact on the vehicle includes: the apparatus for determining the impact on the vehicle including the seat occupancy sensor 2R and 2L attached to the end portion of the seat cushion 11 of the vehicle seat 1 that includes the seat back 12 at the rear portion of the vehicle seat 1, and detecting the compressing-direction load, applied to the end portion of the seat cushion 11 toward the vehicle floor 4, and a pulling-direction load, applied to the end portion of the seat cushion 11 away from the vehicle floor 4, and the controller 3 determining that the impact is applied on the vehicle in a case where the compressing-direction load, which is equal to or larger than the first threshold value W1, is detected and subsequently the pulling-direction load, which is equal to or larger than the second threshold value W2, is detected within the first threshold time period T1, at the end portion of the seat cushion 11 by means of the seat occupancy sensor 2R and 2L, or in a case where the pulling-direction load, which is equal to or larger than the third threshold value W3, is detected and subsequently the compressing-direction load, which is equal to or larger than the fourth threshold value W4, is detected within the second threshold time period T2, at the end portion of the seat cushion 11 by means of the seat occupancy sensor 2R and 2L; and the in-vehicle speaker 5 and the warning light-emitter 6 warning a passenger of the vehicle that the impact is applied on the vehicle in a case where the apparatus for determining the impact on the vehicle determines that the impact is applied on the vehicle.

Further, according to the embodiment, the seat occupancy sensor 2R and 2L is attached to the seat cushion 11 at least one of a front end portion and a rear end portion of the vehicle seat 1.

Furthermore, according to the embodiment, the seat occupancy sensor 2R and 2L is attached to the seat cushion 11 at the rear end portion of the vehicle seat 1.

Still further, according to the embodiment, the seat occupancy sensor 2R and 2L includes a left seat occupancy sensor 2L and a right seat occupancy sensor 2R attached to the seat cushion 11 at a left portion and a right portion of the vehicle seat 1, respectively. The controller 3 determines that the impact is applied on the vehicle in a case where the compressing-direction load, which is equal to or larger than the first threshold value W1, is detected and subsequently the pulling-direction load, which is equal to or larger than the second threshold value W2, is detected within the first threshold time period T1, by means of at least one of the left and right seat occupancy sensors 2L and 2R, which are respectively attached to the seat cushion 11 at the left portion and the right portion of the vehicle seat 1, or in a case where the pulling-direction load, which is equal to or larger than the third threshold value W3, is detected and subsequently the compressing-direction load, which is equal to or larger than the fourth threshold value W4, is detected within the second threshold time period T2, by means of at least one of the left and right seat occupancy sensors 2L and 2R, which are respectively attached to the seat cushion 11 at the left portion and the right portion of the vehicle seat 1.

Accordingly, the passenger may be warned that the impact is applied on the vehicle. Accordingly, the passenger may be informed that the vehicle needs to be inspected.

According to the embodiment, it is determined that the impact is applied on the vehicle in a case where the compressing-direction load, which is equal to or larger than the first threshold value W1, is detected and subsequently the pulling-direction load, which is equal to or larger than the second threshold value W2, is detected within the first threshold time period T1, at the end portion of the seat cushion 11 by means of the seat occupancy sensor 2R and 2L, or in a case where the pulling-direction load, which is equal to or larger than the third threshold value W3, is detected and subsequently the compressing-direction load, which is equal to or larger than the fourth threshold value W4, is detected within the second threshold time period T2, at the end portion of the seat cushion 11 by means of the seat occupancy sensor 2R and 2L.

Accordingly, only by using the known seat occupancy sensors so as to detect the loads, applied on the seat cushion 11, the application of the impact on the vehicle may be easily determined.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining an impact on a vehicle comprising:
   a load detecting portion attached to an end portion of a seat portion of a seat for the vehicle that includes a seat back at a rear portion of the seat for the vehicle, and detecting a compressing-direction load, applied to the end portion of the seat portion toward a floor of the vehicle, and a pulling-direction load, applied to the end portion of the seat portion away from the floor of the vehicle; and
   an impact determining portion determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion by means of the load detecting portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion by means of the load detecting portion.

2. The apparatus for determining the impact on the vehicle according to claim 1, wherein
   the load detecting portion is attached to the seat portion at at least one of a front end portion and a rear end portion of the seat for the vehicle.

3. The apparatus for determining the impact on the vehicle according to claim 2, wherein
   the load detecting portion is attached to a left portion and a right portion of the seat portion, (OR: the load detecting portion includes a left load detecting portion and a right load detecting portion attached to the seat portion at a left portion and a right portion of the seat for the vehicle, respectively and wherein the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

4. The apparatus for determining the impact on the vehicle according to claim 1, wherein
the load detecting portion is attached to the seat portion at the rear end portion of the seat for the vehicle.

5. The apparatus for determining the impact on the vehicle according to claim 4, wherein
the load detecting portion includes a left load detecting portion and a right load detecting portion attached to the seat portion at a left portion and a right portion of the seat for the vehicle, respectively and wherein
the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

6. The apparatus for determining the impact on the vehicle according to claim 1, wherein
the load detecting portion includes a left load detecting portion and a right load detecting portion attached to the seat portion at a left portion and a right portion of the seat for the vehicle, respectively and wherein
the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

7. An apparatus for warning an impact on a vehicle comprising:
an apparatus for determining the impact on the vehicle including
a load detecting portion attached to an end portion of a seat portion of a seat for a vehicle that includes a seat back at a rear portion of the seat for the vehicle, and detecting a compressing-direction load, applied to the end portion of the seat portion toward a floor of the vehicle, and a pulling-direction load, applied to the end portion of the seat portion away from the floor of the vehicle, and
an impact determining portion determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion by means of the load detecting portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion by means of the load detecting portion; and
an impact warning portion warning a passenger of the vehicle that the impact is applied on the vehicle in a case where the apparatus for determining the impact on the vehicle determines that the impact is applied on the vehicle.

8. The apparatus for warning the impact on the vehicle according to claim 7, wherein
the load detecting portion is attached to the seat portion at at least one of a front end portion and a rear end portion of the seat for the vehicle.

9. The apparatus for warning the impact on the vehicle according to claim 8, wherein
the load detecting portion includes a left load detecting portion and a right load detecting portion attached to the seat portion at a left portion and a right portion of the seat for the vehicle, respectively and wherein
the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

10. The apparatus for warning the impact on the vehicle according to claim 7, wherein
the load detecting portion is attached to the seat portion at the rear end portion of the seat for the vehicle.

11. The apparatus for warning the impact on the vehicle according to claim 10, wherein
the load detecting portion includes a left load detecting portion and a right load detecting portion attached to the seat portion at a left portion and a right portion of the seat for the vehicle, respectively and wherein
the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

12. The apparatus for warning the impact on the vehicle according to claim 7, wherein
the load detecting portion includes a left load detecting portion and a right load detecting portion attached to the seat portion at a left portion and a right portion of the seat for the vehicle, respectively and wherein
the impact determining portion determines that the impact is applied on the vehicle in a case where the compressing-direction load, which is equal to or larger than the first predetermined value, is detected and subsequently the pulling-direction load, which is equal to or larger than the second predetermined value, is detected within the first predetermined time period, by means of at least one of the left and right load detecting portions, which are respectively attached to the seat portion at the left portion and the right portion of the seat for the vehicle, or in a case where the pulling-direction load, which is equal to or larger than the third predetermined value, is detected and subsequently the compressing-direction load, which is equal to or larger than the fourth predetermined value, is detected within the second predetermined time period, by means of at least one of the left and right load detecting portions, which are respectively attached to the seat portion at the left portion and the right portion of the seat for the vehicle.

13. A method for determining an impact on a vehicle comprising:
detecting a compressing-direction load, applied to an end portion of a seat portion toward a floor of the vehicle, and a pulling-direction load, applied to the end portion of the seat portion away from the floor of the vehicle; and
determining that the impact is applied on the vehicle in a case where the compressing-direction load, which is equal to or larger than a first predetermined value, is detected and subsequently the pulling-direction load, which is equal to or larger than a second predetermined value, is detected within a first predetermined time period, at the end portion of the seat portion, or in a case where the pulling-direction load, which is equal to or larger than a third predetermined value, is detected and subsequently the compressing-direction load, which is equal to or larger than a fourth predetermined value, is detected within a second predetermined time period, at the end portion of the seat portion.

* * * * *